United States Patent
Egretzberger et al.

(10) Patent No.: US 9,377,483 B2
(45) Date of Patent: Jun. 28, 2016

(54) METHOD FOR THE DECOUPLED CONTROL OF THE QUADRATURE AND THE RESONANCE FREQUENCY OF A MICRO-MECHANICAL GYROSCOPE

(75) Inventors: Markus Egretzberger, Atzenbrugg (AT); Florian Mair, Vienna (AT); Andreas Kugi, Loinde (AT)

(73) Assignee: Continental Teves AG & Co. oHG (DE)

( * ) Notice: Subject to any disclaimer, the term of this patent is extended or adjusted under 35 U.S.C. 154(b) by 906 days.

(21) Appl. No.: 13/634,301

(22) PCT Filed: Mar. 17, 2011

(86) PCT No.: PCT/EP2011/054089
§ 371 (c)(1),
(2), (4) Date: Nov. 13, 2012

(87) PCT Pub. No.: WO2011/113916
PCT Pub. Date: Sep. 22, 2011

(65) Prior Publication Data
US 2013/0199263 A1    Aug. 8, 2013

(30) Foreign Application Priority Data
Mar. 17, 2010   (DE) .......................... 10 2010 002 973

(51) Int. Cl.
*G01C 19/56*    (2012.01)
*G01P 15/125*    (2006.01)
*G01C 19/5726*    (2012.01)

(52) U.S. Cl.
CPC .............. *G01P 15/125* (2013.01); *G01C 19/56* (2013.01); *G01C 19/5726* (2013.01)

(58) Field of Classification Search
CPC ........... G01C 19/5726; G01C 19/5747; G01C 19/5762; G01C 19/56; G01C 19/5719; G01C 19/5614; G01C 19/5776

USPC .............. 73/1.37, 1.38, 1.77, 504.14, 504.16, 73/504.04, 504.12
See application file for complete search history.

(56) References Cited

U.S. PATENT DOCUMENTS 5,481,914 A    1/1996 Ward
5,847,279 A *  12/1998 Piazza ........................ 73/504.16
(Continued)

FOREIGN PATENT DOCUMENTS

CN    1898528    1/2007
CN    102893128    1/2013
(Continued)

OTHER PUBLICATIONS

German Search Report corresponding to German Application No. 10 2011 005 744.7, dated Apr. 12, 2012.
(Continued)

*Primary Examiner* — Helen Kwok
(74) *Attorney, Agent, or Firm* — RatnerPrestia (57) ABSTRACT

A method for the precise measuring operation of a micromechanical rotation rate sensor, including at least one seismic mass, at least one drive device for driving the seismic mass in the primary mode (qi) and at least three trimming electrode elements which are jointly associated directly or indirectly with the seismic mass. An electric trimming voltage ($u_1, u_2, u_3, u_4$) is set respectively between said trimming electrode elements and the seismic mass. Each of the electric trimming voltages ($u_1, u_2, u_3, u_4$) are adjusted in accordance with a resonance frequency variable ($\tilde{u}_T, \tilde{U}_{T,0}$), a quadrature variable ($\tilde{u}_T, \tilde{U}_{T,0}$) and a restoring variable ($\tilde{u}_S$).

15 Claims, 4 Drawing Sheets

(56) References Cited

U.S. PATENT DOCUMENTS

| | | | |
|---|---|---|---|
| 6,067,858 A * | 5/2000 | Clark et al. | 73/504.16 |
| 6,089,089 A * | 7/2000 | Hsu | 73/504.12 |
| 6,250,156 B1 * | 6/2001 | Seshia et al. | 73/504.12 |
| 7,337,665 B2 | 3/2008 | Schroeder | |
| 7,481,110 B2 | 1/2009 | Handrich et al. | |
| 7,805,993 B2 | 10/2010 | Spahlinger | |
| 8,661,898 B2 * | 3/2014 | Watson | 73/504.12 |
| 2001/0039834 A1 * | 11/2001 | Hsu | 73/504.02 |
| 2003/0061877 A1 * | 4/2003 | Stewart et al. | 73/510 |
| 2003/0159510 A1 * | 8/2003 | Stewart et al. | 73/504.12 |
| 2004/0173023 A1 | 9/2004 | Yan | |
| 2005/0082252 A1 | 4/2005 | Nasiri | |
| 2005/0268716 A1 | 12/2005 | Hrovat | |
| 2006/0010999 A1 * | 1/2006 | Schroeder | 74/5.4 |
| 2006/0020409 A1 * | 1/2006 | Schroeder | 702/106 |
| 2006/0101910 A1 * | 5/2006 | Schroeder | 73/504.08 |
| 2007/0144255 A1 * | 6/2007 | Handrich et al. | 73/504.12 |
| 2008/0284628 A1 | 11/2008 | Willig | |
| 2010/0186503 A1 | 7/2010 | Spahlinger | |
| 2010/0294039 A1 | 11/2010 | Geen | |
| 2013/0197858 A1 * | 8/2013 | Egretzberger et al. | 702/145 |
| 2013/0199263 A1 | 8/2013 | Egretzberger | |

FOREIGN PATENT DOCUMENTS

| | | |
|---|---|---|
| DE | 102 48 733 | 5/2004 |
| DE | 10320675 | 12/2004 |
| DE | 103 60 962 | 7/2005 |
| EP | 2547984 | 1/2013 |
| WO | WO 03/010492 | 2/2003 |
| WO | WO 2004/038331 | 5/2004 |
| WO | WO 2005/066585 | 7/2005 |
| WO | WO 2008/031480 | 3/2008 |

OTHER PUBLICATIONS

International Search Report corresponding to International Application No. PCT/EP2011/054089, dated Jun. 28, 2011.
International Search Report for PCT International Application No. PCT/EP2011/054090 mailed Jun. 28, 2011.
German Search Report for Application No. DE 10 2011 005 745.5 dated Apr. 13, 2012.
Entire patent prosecution history of U.S. Appl. No. 13/634,585, filed, Nov. 13, 2012, entitled, "Method for the Decoupled Control of the Quadrature and the Resonance Frequency of a Micro-Mechanical Rotation Rate Sensor by Means of Sigma-Delta-Modulation."
Non-Final Office Action mailed Mar. 30, 2016 in U.S. Appl. No. 13/634,585.

* cited by examiner

METHOD FOR THE DECOUPLED CONTROL OF THE QUADRATURE AND THE RESONANCE FREQUENCY OF A MICRO-MECHANICAL GYROSCOPE

CROSS REFERENCE TO RELATED APPLICATIONS

This application is the U.S. National Phase Application of PCT International Application No. PCT/EP2011/054089, filed Mar. 17, 2011, which claims priority to German Patent Application No. 10 2010 002 973.4, filed Mar. 17, 2010, the contents of such applications being incorporated by reference herein.

FIELD OF THE INVENTION

The invention relates to a method according to precise measuring operation of a micro-mechanical rotation rate sensor, comprising at least one seismic mass, at least one drive device for driving the seismic mass in the primary mode ($q_1$) and at least three trimming electrode elements which are jointly associated directly or indirectly with the seismic mass, wherein an electric trimming voltage ($u_1, u_2, u_3, u_4$) is applied between each of these individual trimming electrode elements and the seismic mass, and to a micro-mechanical rotation rate sensor having at least three trimming electrode elements which are jointly associated with a first seismic mass.

BACKGROUND OF THE INVENTION

It is known that micro-mechanical springs for suspending seismic masses in rotation rate sensors to a certain extent already cause deflections in the reading-out direction in the drive mode or primary mode owing to relatively small fabrication inaccuracies which lead, in particular, to undesired edge angles of the respective structures without the presence of a rotation rate. As a result, interference signals are generated which can be undesirably evaluated as rotation rate signal components and therefore falsify the rotation rate signal or cause a measuring error with respect to the rotation rate signal.

Such undesired edge angles or tilting of springs are process-induced and can be avoided only to a limited degree. The interference signals described above, which do not come about owing to a detected rotation rate but rather owing to faulty deflections in the reading-out direction as a function of the deflection of the seismic mass and the springs thereof in the drive direction, are also referred to as quadrature or quadrature signals.

Document WO 03/010492 A, which is incorporated by reference, 1 proposes a method for suppressing quadrature signals in a rotation rate sensor which comprises two trimming electrode arrangements which are associated with a seismic mass, in which method the quadrature of the rotation rate sensor is suppressed by means of the voltage applied to the trimming electrodes. However, this quadrature suppression can undesirably influence the resonance frequency of the reading-out mode of the rotation rate sensor, as a result of which the differential frequency between the resonance frequencies is also changed with respect to the drive mode or primary mode and the reading-out mode or secondary mode of the rotation rate sensor. This is all the more disadvantageous since the voltage which is applied to the trimming electrodes is included quadratically in the shifting of the resonance frequency of the reading-out mode.

It is customary that the embodiment of the quadrature of rotation rate sensors of a wafer varies to a relatively high degree owing to process fluctuations and differs to a relatively high degree from one rotation rate sensor to another of a wafer.

Furthermore it is known to reset the deflection of the seismic mass/masses of a rotation rate sensor with respect to the reading-out mode or secondary mode by means of at least one trimming electrode element or a trimming electrode. However, this also usually influences the resonance frequency of the secondary oscillator, as well as influencing possible quadrature suppression.

SUMMARY OF THE INVENTION

The invention proposes a method for the measuring operation of a rotation rate sensor and a corresponding rotation rate sensor with which resetting of the deflection of the secondary mode on the basis of a detected rotation rate, quadrature suppression and a resonance frequency setting of the secondary oscillator can be carried out jointly, in particular in such a way that these three influences can be implemented or set at least partially independently of one another.

This is achieved according to aspects of the invention by means of the method for the precise measuring operation of a micro-mechanical rotation rate sensor, comprising at least one seismic mass, at least one drive device for driving the seismic mass in the primary mode ($q_1$) and at least three trimming electrode elements which are jointly associated directly or indirectly with the seismic mass, wherein an electric trimming voltage ($u_1, u_2, u_3, u_4$) is applied between each of these individual trimming electrode elements and the seismic mass, wherein each of these electric trimming voltages ($u_1, u_2, u_3, u_4$) is set as a function of a resonance frequency manipulated variable ($\tilde{u}_T, \tilde{U}_{T,0}$) a quadrature manipulated variable ($\tilde{u}_C, \tilde{U}_{C,0}$) and a resetting variable ($\tilde{u}_S$) and the micro-mechanical rotation rate sensor comprising at least one seismic mass, at least one drive device for driving the seismic mass in the primary mode and at least three trimming electrode elements which are jointly assigned directly or indirectly to the seismic mass, wherein an electric trimming voltage is applied between each of these individual trimming electrode elements and the seismic mass, wherein the rotation rate sensor is embodied in such a way that it is suitable for carrying out the method.

The method and the rotation rate sensor are preferably embodied or designed in such a way that at least the setting of the resonance frequency can be implemented independently of the resetting of the deflection of the seismic mass on the basis of a detected rotation rate and the quadrature suppression, and that, in particular, it is also possible to implement independently of one another the resetting of the deflection on the basis of a detected rotation rate, the entire deflection of the at least one seismic mass within the scope of the secondary mode, and the quadrature suppression.

The quadrature manipulated variable is preferably defined as a manipulated variable for suppressing the deflection or oscillation of the secondary mode owing to the quadrature. As a result, in particular, an undesired quadrature signal or a quadrature signal component of the output signal of the rotation rate sensor, which is phase-shifted essentially through 90° or 270° with respect to the portion of the output signal of the rotation rate sensor which forms the rotation rate, is suppressed.

The resetting variable is expediently a harmonic oscillation signal whose amplitude is determined by the output of the first controller unit, wherein this amplitude value is multiplied by a harmonic oscillation signal which has the same frequency as the primary mode or drive mode.

The resonance frequency manipulated variable is preferably defined as a static variable with which the frequency difference between the resonance frequency of the reading-out mode and the resonance frequency of the drive mode has substantially a defined value or is adjusted to a defined value or alternatively is preferably essentially zero or is adjusted to zero.

A drive mode or primary mode is preferably understood to be a natural mode of a rotation rate sensor, preferably the natural oscillation, particularly preferably the oscillation at a resonance frequency of the at least one seismic mass in which the seismic mass of the rotation rate sensor oscillates, in particular, continuously. Quite particularly preferably the rotation rate sensor has at least two seismic masses which are coupled to one another and which oscillate in anti-phase or are each deflected in the same direction with an inverse orientation to one another in the course of the drive mode.

A reading-out mode or secondary mode is preferably understood to be a natural mode which preferably occurs owing to a rotation rate and the associated effect of the Coriolis effect.

It is preferred that the rotation rate sensor comprises at least four trimming electrode elements which are jointly associated directly or indirectly with the seismic mass, wherein a first electric trimming voltage is applied between the first trimming electrode element and the seismic mass, a second trimming voltage is applied between the second trimming electrode element and the seismic mass, a third trimming voltage is applied between the third trimming electrode element and the seismic mass, and a fourth trimming voltage is applied between the fourth trimming electrode element and the seismic mass, wherein the first trimming voltage $u_1$, the second trimming voltage $u_2$, the third trimming voltage $u_3$ and the fourth trimming voltage $u_4$ are each set substantially with the following dependence of the resonance frequency manipulated variable $\tilde{u}_T$, the quadrature manipulated variable $\tilde{u}_C$ and the resetting variable $\tilde{u}_S$:

$$u_1 = \sqrt{\tilde{u}_T - \tilde{u}_C + \tilde{u}_S}, \quad u_2 = \sqrt{\tilde{u}_T + \tilde{u}_C - \tilde{u}_S},$$
$$u_3 = \sqrt{\tilde{u}_T + \tilde{u}_C + \tilde{u}_S}, \quad u_4 = \sqrt{\tilde{u}_T - \tilde{u}_C - \tilde{u}_S}.$$

The resetting variable is alternatively preferably also understood to be $\tilde{U}_{S,C}$ and/or the resonance frequency manipulated variable to be $\tilde{U}_{T,0}$ and/or the quadrature manipulated variable to be $\tilde{U}_{C,0}$.

The trimming electrode elements are preferably each embodied and arranged in such a way that a capacitor $C_1$, $C_2$, $C_3$ and $C_4$ is formed between the first, second, third and fourth trimming electrode element and a respectively associated mass electrode element of the associated seismic mass, with the associated trimming voltage being applied between the trimming electrode element and the mass electrode element, as follows:

$$C_1 = \varepsilon_0 \frac{A_1 + r_1 t_1 q_1}{g_1 - s_1 q_2}, \quad C_2 = \varepsilon_0 \frac{A_2 + r_2 t_2 q_1}{g_2 + s_2 q_2}, \quad C_3 = \varepsilon_0 \frac{A_3 - r_3 t_3 q_1}{g_3 - s_3 q_2},$$

and $$C_4 = \varepsilon_0 \frac{A_4 - r_4 t_4 q_1}{g_4 + s_4 q_2},$$

where i is in each case an index relating to the numbering of the electrode elements, $g_i$ is the distance across the gap between the trimming electrode element and the associated mass electrode element in the non-deflected state, $A_i$ is the overlapping area between the trimming electrode element and the associated mass electrode element in the non-deflected state, the product $\pm r_i$ times $t_i$ times $q_1$ is the change in the overlapping area as a function of the deflection of the primary mode $q_1$, wherein $t_i$ is the overlapping depth between the trimming electrode element and the associated mass electrode element, and $r_i$ is a first positive geometric constant relating to the deflection of the primary mode $q_1$, and the product $\pm s_i$ times $q_2$ is the change in the distance across the gap between the trimming electrode element and the mass electrode element as a function of the deflection of the secondary mode $q_2$, wherein $s_i$ is a second positive geometric constant relating to the deflection of the secondary mode $q_2$.

The trimming electrode elements are preferably embodied as planar capacitor plates which are arranged substantially parallel to the x-y plane of a Cartesian coordinate system. In this context, the deflection, defined by the product $\pm r_i^* q_1$, of the mass electrode elements takes place, in particular, in the x direction relative to the trimming electrode elements. The overlapping depth $t_i$ of the trimming electrode elements is oriented here in the y direction. The deflection of the mass electrode elements in the z direction relative to the trimming electrode elements is particularly preferably oriented in the z direction.

$A_i$, $r_i$, $t_i$, $g_i$ and $s_i$ are preferably substantially the same size in all the trimming electrode element mass electrode element pairs, that is to say $A_1=A_2=A_3=A_4$, and correspondingly there are respectively identical values for i-th values of $r_i$, $t_i$, $g_i$, and $s_i$.

It is preferred that the rotation rate sensor comprises a control arrangement with which the electric trimming voltages are adjusted, wherein the demodulated controlled variable Y is fed to a first controller unit, which controlled variable Y is acquired, in particular, by means of demodulation from the original controlled variable y using two harmonic signals which are phase-shifted through 90° with respect to one another, wherein the original controlled variable y represents the detected deflection of the seismic mass in the direction of its secondary mode. This demodulation takes place, in particular, with two harmonic signals which are phase-shifted through 90° with respect to one another, in each case with the frequency corresponding to the resonance frequency of the primary mode.

It is expedient that the control arrangement has an output variable transformation unit in which the demodulated controlled variable Y is transformed dynamically as a function of the frequency difference between the primary mode frequency $\omega_1$ and the secondary mode frequency $\omega_2$ and at least one damping parameter or is transformed in a steady-state fashion into a rotation rate variable and a quadrature variable as a function of at least one transformation constant, after which a rotation rate control error variable and a quadrature control error variable are formed therefrom, in each case with the definition of a reference variable, and subsequently the rotation rate control error variable and a quadrature control error variable are fed as input variables to the first controller unit which generates at least the quadrature manipulated variable $\tilde{u}_C$ and the resetting variable $\tilde{u}_S$ on the output side for the at least partially decoupled quadrature suppression and the resetting of the deflection of the seismic mass on the basis of a detected rotation rate.

Alternatively, a control error variable is preferably formed from the demodulated controlled variable Y with the definition of a control reference variable, after which the control arrangement is dynamically transformed in an output variable transformation unit the control error variable as a function of the frequency difference between the primary mode frequency $\omega_1$ and the secondary mode frequency $\omega_2$ and at least one damping parameter or is transformed in a steady-state fashion into a rotation rate control error variable and a quadrature control error variable as a function of at least one transformation constant, after which the rotation rate control error variable and the quadrature control error variable are fed as input variables to the first controller unit which generates on the output side at least the quadrature manipulated variable $\tilde{u}_C$ and the resetting variable $\tilde{u}_S$ for the at least partially decoupled quadrature suppression and resetting of the deflection of the seismic mass on the basis of a detected rotation rate.

Preferably, the rotation rate sensor, in particular the control arrangement thereof, has a manipulated variable transformation unit, by which the trimming voltages $u_1$, $u_2$, $u_3$ and $u_4$ are made available as a function of the resonance frequency manipulated variable $\tilde{u}_T$, the quadrature manipulated variable $\tilde{u}_C$ and the resetting variable $\tilde{u}_S$ in accordance with the equations $$u_1 = \sqrt{\tilde{u}_T - \tilde{u}_C + \tilde{u}_S},\ u_2 = \sqrt{\tilde{u}_T + \tilde{u}_C - \tilde{u}_S},\ u_3 = \sqrt{\tilde{u}_T + \tilde{u}_C + \tilde{u}_S},$$
$$u_4 = \sqrt{\tilde{u}_T - \tilde{u}_C - \tilde{u}_S}.$$

It is preferred that the output variable transformation unit is configured in such a way that it carries out multiplication of the demodulated controlled variable Y or of the control error variable which is dependent thereon, with the following transformation matrix $$T(S) = \begin{bmatrix} -1 & \frac{\omega_1 - \omega_2}{s - \alpha_2} \\ \frac{\omega_1 - \omega_2}{s - \alpha_2} & 1 \end{bmatrix},$$

where $\alpha_2$ is a damping parameter relating to the secondary mode, and s is the Laplace variable.

The control arrangement preferably has a frequency controller unit which makes available the resonance manipulated variable $\tilde{u}_T$ as a function of a frequency information item or as a function of a frequency control error information item dependent thereon from the demodulated controlled variable Y.

It is preferred that a harmonic frequency identification signal is generated in the control arrangement or fed thereto, which frequency identification signal has a frequency $\omega_S$ which is different from the primary mode frequency $\omega_1$, wherein the frequency identification signal is superimposed on the quadrature manipulated variable $\tilde{u}_C$ and/or the resetting variable $\tilde{u}_S$, in particular only the resetting variable $\tilde{u}_S$, after which the frequency information is acquired from the demodulated controlled variable Y after additional demodulation with the frequency $\omega_S$ by means of the frequency difference between the primary mode frequency $\omega_1$ and the secondary mode frequency $\omega_2$, after which at least the resonance frequency manipulated variable $\tilde{u}_T$ is made available by the frequency controller unit as a function of this information or as a function of frequency control error information dependent thereon.

It is expedient that after the additional demodulation with the frequency $\omega_S$, in particular with a harmonic signal with the frequency $\omega_S$, the frequency information of the output variable transformation unit is made available, and in addition a frequency control error information item is acquired from the frequency information by means of a frequency information reference variable which is, in particular, 0 Hz, after which this frequency control error information is fed to the frequency controller unit which generates the resonance frequency manipulated variable $\tilde{u}_T$ therefrom.

It is preferred that the harmonic frequency identification signal is introduced as a reference variable or superimposed on the reference variable, either upstream of the output variable transformation unit in order to generate the control error variable, or respectively downstream of the output variable transformation unit in order to generate the rotation rate control error variable and the quadrature control error variable, after which the rotation rate control error variable and the quadrature control error variable are fed as input variables to the first controller unit which generates at least the quadrature manipulated variable $\tilde{u}_C$ and the resetting variable $\tilde{u}_S$ on the output side.

It is expedient that the resetting variable, which is subject to information of the frequency identification signal, is then demodulated with the frequency $\omega_S$, in particular with a harmonic signal with the frequency $\omega_S$, as a result of which the frequency information is acquired, after which this frequency information is made available to the output variable transformation unit, and in addition a frequency control error information item is acquired from the frequency information by means of a frequency information reference variable which is, in particular, 0 Hz, after which this frequency control error information is fed to the frequency controller unit, which generates the resonance frequency manipulated variable $\tilde{u}_T$ therefrom.

The rotation rate signal is preferably acquired as a measurement signal, which is substantially proportional to the detected rotation rate, from the amplitude of the resetting variable, in particular by low-pass filtering.

It is preferred that the rotation rate sensor is embodied in such a way that it can detect rotation rates about at least two different axes, that is to say the rotation rate sensor is of "multi-axis" design.

It is preferred that the first and second trimming electrode elements are embodied and arranged in a substantially non-movable fashion, in particular in relation to the respective electrode face of said electrode element, and are electrically insulated and arranged spaced apart from the seismic mass.

The trimming electrode elements are expediently isolated from one another and particularly preferably each of identical design.

The rotation rate sensor expediently has two seismic masses which are coupled to one another.

It is expedient that the first and second trimming electrode elements each have at least one electrode face, which electrode faces are arranged substantially parallel to and opposite a trimming face of the seismic mass, and wherein the electrode faces of the first and second trimming electrode elements are always associated with a region of the trimming face lying opposite and/or said electrode faces overlap this region, in particular independently of the deflection state of the seismic mass, at least up to a defined amplitude/deflection, particularly preferably even in the case of maximum deflection of the seismic mass. The electrode faces expediently always project beyond the opposite region of the trimming face here. The electrode faces and the trimming face are quite particularly preferably of substantially planar design.

A micro-mechanical rotation rate sensor is preferably understood to be a micro-mechanical gyroscope.

The invention also relates to the use of the rotation rate sensor in motor vehicles, in particular in a motor vehicle control system.

The method according to aspects of the invention and the rotation rate sensor according to aspects of the invention can be used in different regions for detecting one or more rotation rates and/or by means of corresponding signal processing for detecting one or more rotational accelerations. In this context, the use is preferred in vehicles, in particular in motor vehicles and aircraft, in automation technology, in navigation systems, in image stabilizers of cameras, in industrial robotics and in games consoles, and particularly preferably in the respective corresponding control systems in this context. The use of the method and of the rotation rate sensor is quite particularly preferred in/as a yaw rate sensor/yaw rate sensors and/or in/as a yaw acceleration sensor/sensors in a motor vehicle control system such as, for example, ESP.

BRIEF DESCRIPTION OF THE DRAWINGS

The invention is best understood from the following detailed description when read in connection with the accompanying drawings. Included in the drawings is the following figures:

FIG. 3 shows an exemplary concept A of the method and of the rotation rate sensor in which the harmonic frequency identification signal is fed in.

DETAILED DESCRIPTION OF THE PREFERRED EMBODIMENTS

Figure 1:
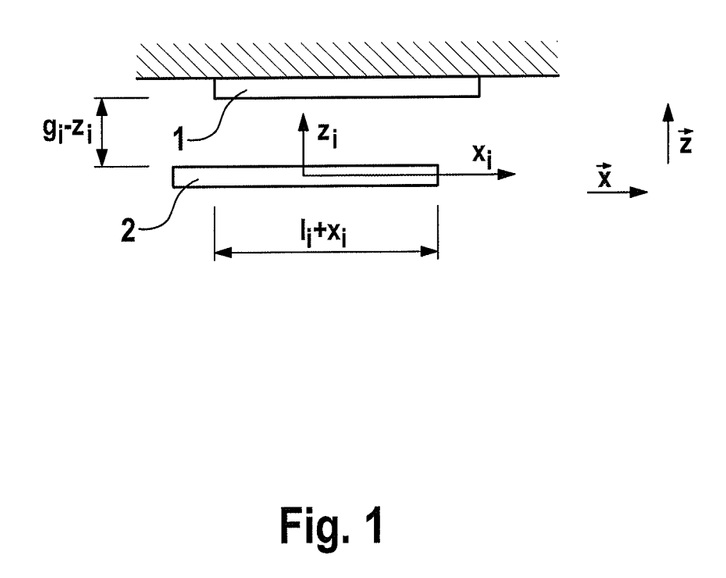
FIG. 1 shows an exemplary embodiment of a capacitor formed from a trimming electrode element which is embodied in a positionally fixed fashion with respect to the sensor housing, and from a mass electrode element which is connected to the seismic mass or is embodied as a part thereof.

The exemplary capacitor illustrated in FIG. 1 and composed of a trimming electrode element 1 and mass electrode element 2 is as a parallel plate capacitor—wherein the distance or the distance across the gap $g_i$ is formed in the z direction between the two electrodes, and the deflection of the mass electrode element occurs in the x direction in the primary mode, wherein the change in the overlapping area occurs in the x direction, and the deflection of the mass electrode element occurs in the z direction in the secondary mode.

Figure 3:
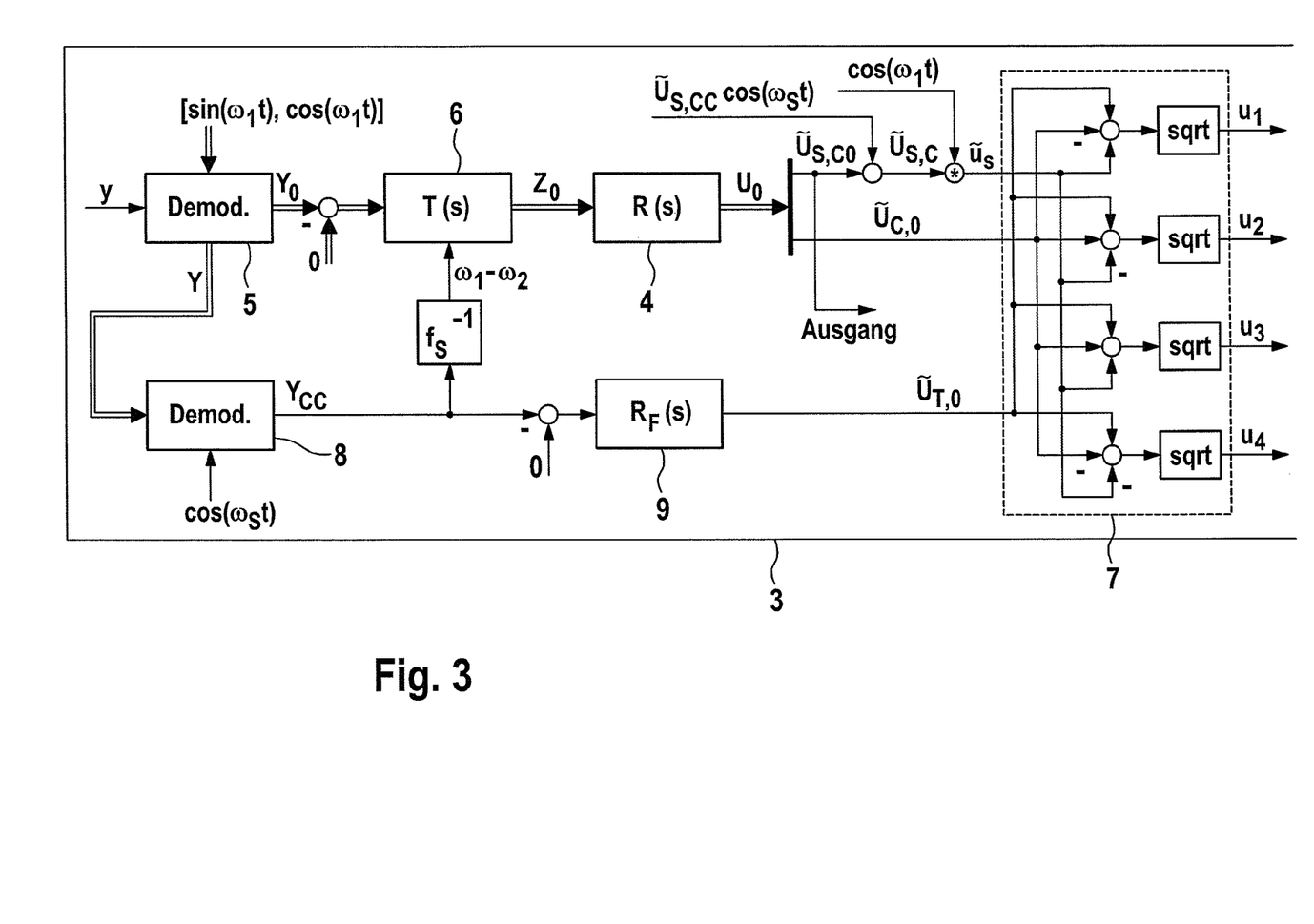

FIG. 3 illustrates, by way of example, the method and rotation rate sensor according to concept A. The rotation rate sensor comprises a control arrangement 3 with which the electric trimming voltages $u_1$, $u_2$, $u_3$, and $u_4$ are adjusted, wherein the demodulated controlled variable Y is fed to a first controller unit 4, which controlled variable Y is acquired, in particular, from the original controlled variable y by means of demodulation 5 using two harmonic signals which are phase-shifted through 90° with respect to one another, wherein the original controlled variable y represents the detected deflection of the seismic mass in the direction of its secondary mode.

In this context, a control error variable is formed, by way of example, from the demodulated controlled variable Y with definition of a control reference variable 0, after which, in an output variable transformation unit 6, the control arrangement 3 is transformed dynamically the control error variable into a rotation rate control error variable and a quadrature control error variable, symbolized as $Z_0$, as a function of the frequency difference between the primary mode frequency $\omega_1$ and the secondary mode frequency $\omega_2$ and at least one damping parameter, after which the rotation rate control error variable and the quadrature control error variable are fed as input variables to the first controller unit 4, which generates on the output side the quadrature manipulated variable $\tilde{u}_C$ and the resetting variable $\tilde{u}_S$ for the at least partially decoupled quadrature suppression and resetting of the deflection of the seismic mass on the basis of a detected rotation rate. In this context, the first controller unit 4 makes available the amplitude $\tilde{U}_{S,C}$, which is multiplied by a harmonic oscillation cos ($\omega_1$ t) with the same frequency as the primary mode, as a result of which the dynamic resetting variable $\tilde{u}_S$ is generated.

Furthermore, the control arrangement 3 has a manipulated variable transformation unit 7 which makes available the trimming voltages $u_1$, $u_2$, $u_3$ and $u_4$ as a function of the resonance frequency manipulated variable $\tilde{u}_T$, here referred to as $\tilde{U}_{T,0}$, the quadrature manipulated variable $\tilde{u}_C$, here referred to as $\tilde{U}_{C,0}$, and the resetting variable $\tilde{u}_S$ in accordance with the equations $$u_1 = \sqrt{\tilde{u}_T - \tilde{u}_C + \tilde{u}_S},\ u_2 = \sqrt{\tilde{u}_T + \tilde{u}_C - \tilde{u}_S},\ u_3 = \sqrt{\tilde{u}_T + \tilde{u}_C + \tilde{u}_S},$$
$$u_4 = \sqrt{\tilde{u}_T - \tilde{u}_C - \tilde{u}_S}.$$

In addition, in the control arrangement 3 a harmonic frequency identification signal $\tilde{U}_{S,CC} \cos(\omega_S t)$ is generated which has a frequency $\omega_S$ which is different from the primary mode frequency $\omega_1$, wherein the frequency identification signal is superimposed on the resetting variable $\tilde{U}_{S,CO}$, which is also the output signal of the rotation rate sensor which is proportional to the detected rotation rate, after which the frequency information $Y_{CC}$ is acquired from the demodulated controlled variable $Y_0$ after additional demodulation 8 with the frequency $\omega_S$, by means of the frequency difference between the primary mode frequency $\omega_1$ and the secondary mode frequency $\omega_2$. The frequency information $Y_{CC}$ is subsequently made available to the output variable transformation unit 6, and in addition a frequency control error information item is acquired from the frequency information by means of a frequency information reference variable 0, after which this frequency control error information is fed to the frequency controller unit 9, which generates the resonance frequency manipulated variable $\tilde{u}_T$, or referred to here as $\tilde{U}_{T,0}$, therefrom.

Figure 4:
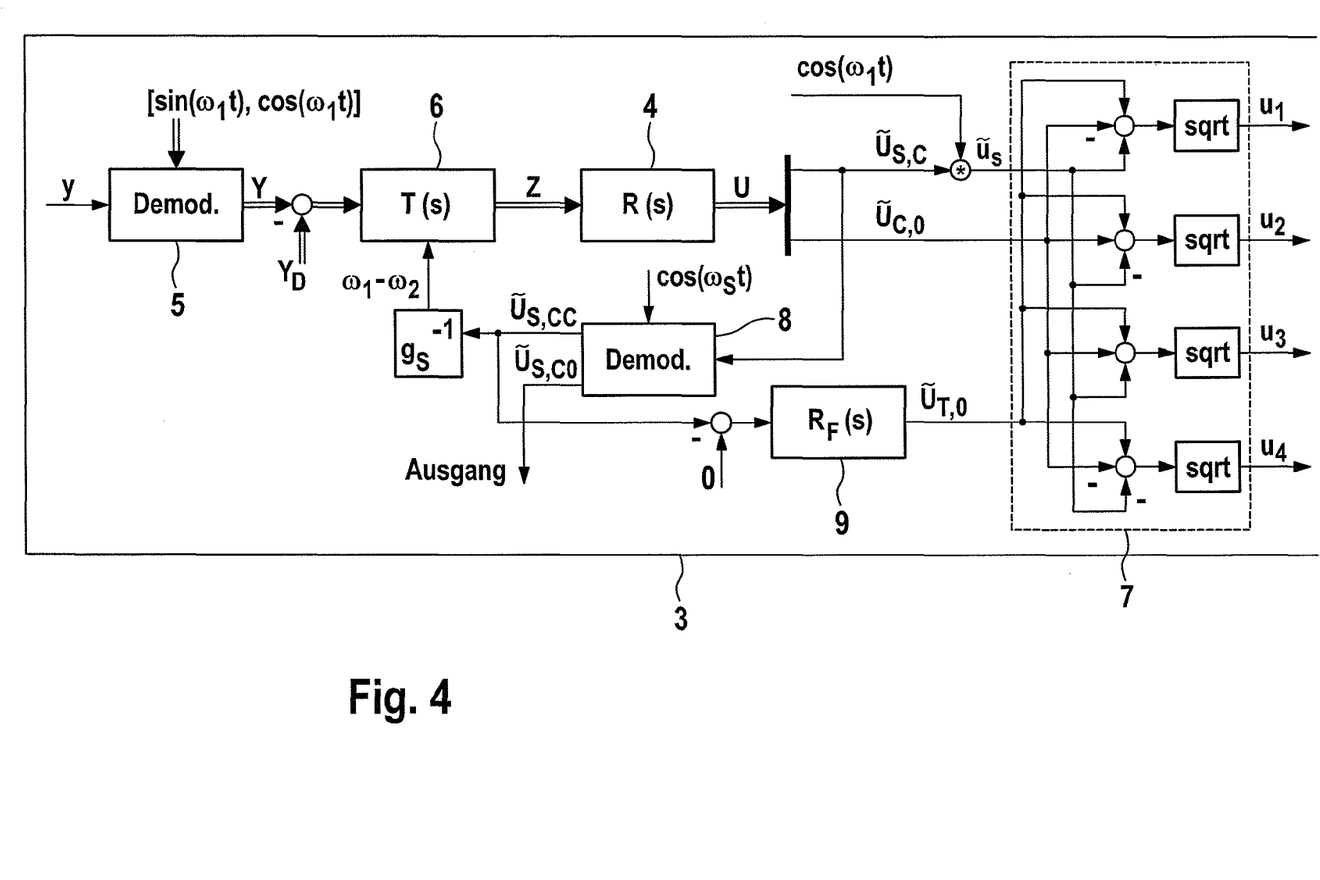
FIG. 4 shows an exemplary concept B of the method and of the rotation rate sensor in which the harmonic frequency identification signal is predefined as a reference variable.

Taking the concept A shown in FIG. 3 as a basis, FIG. 4 shows the exemplary concept B. In this context, in contrast to concept A the harmonic frequency identification signal, now referred to as $Y_D$ here, is introduced upstream of the output variable transformation unit 6 as a reference variable for generating the control error variable, after which the rotation rate control error variable and the quadrature control error variable Z are fed as input variables to the first controller unit 4, which generates on the output side at least the quadrature manipulated variable and the resetting variable, together U, comprising $\tilde{U}_{S,C}$, which is multiplied by the harmonic oscillation cos($\omega_1$ t) again in order to generate the resetting variable $\tilde{u}_S$, and in order to generate the quadrature manipulated variable $\tilde{u}_C$, referred to as $\tilde{U}_{C,0}$ here. The resetting variable $\tilde{U}_{S,C}$, which is subject to information of the frequency identification signal, is subsequently demodulated with the frequency $\omega_S$ in the additional demodulator 8, as a result of which the signal $\tilde{U}_{S,CC}$ which contains the frequency information and the signal $\tilde{U}_{S,C0}$ which represents the detected rotation rate are acquired. The signal $\tilde{U}_{S,CC}$ which contains the frequency information is subsequently made available to the output variable transformation unit 7, and in addition a frequency control error information item is acquired from the frequency information by means of a frequency information reference variable 0, after which this frequency control error information is fed to the frequency controller unit 9, which generates the resonance frequency manipulated variable $\tilde{u}_T$, referred to here as $\tilde{U}_{T,0}$, therefrom.

By way of example a description and analysis are given below by means of mathematical illustrations. Micro-electromechanical rotation rate sensors typically have at least two weakly damped mechanical vibration modes which are orthogonal with respect to one another, referred to as the primary mode and the secondary mode, which are coupled by means of the Coriolis effect when a rotation rate occurs. As a result of manufacturing-induced inaccuracies, further coupling generally occurs between the primary and secondary modes in the form of an unbalance effect, which is referred to as a quadrature. However, in the output signal of the sensor, the signal components have a phase difference of 90° owing to the Coriolis effect and the unbalance effect. The output signal can be accordingly decomposed into a rotation rate component and a quadrature component by corresponding demodulation. The conventional control concept of micromechanical rotation rate sensors therefore typically comprises a quadrature controller which compensates the signal component owing to the unbalance effect using an additional actuator system. Any offset drifts of the rotation rate component in the output signal owing to demodulation errors can be avoided in this way. In order to increase the sensitivity, generally extremely weakly damped mechanical structures are used. The resulting slow dynamic response behavior of the sensor owing to a rotation rate can be improved by compensating the rotation rate component using further suitable actuators in a resetting controller. The desired sensor dynamics are then predefined by the closed circuit of the resetting controller. The maximum sensitivity of the rotation rate sensor is reached if the resonance frequencies of the primary and secondary modes are identical. Since the change in sensitivity in the vicinity of this working point is very large even when small parameter deviations occur, it is necessary to control the resonance frequency. The present invention is concerned with designing an overall control concept which comprises the quadrature control, resetting control and frequency control.

The type of sensor on which this invention is based is a capacitive rotation rate sensor. In this context, the primary and secondary oscillations are excited and read out by means of capacitive actuators and sensors. For the rest it is assumed that in the primary mode the rotation rate sensor is made to vibrate harmonically with a constant amplitude using suitable capacitive actuators or at least one drive device. The frequency of the oscillation corresponds here to the resonance frequency of the primary mode. Furthermore, if it is assumed that the amplitude and frequency of the primary oscillation are ideally adjusted to a constant setpoint value, the reaction of the secondary oscillation on the primary oscillation can be ignored, and the movement differential equation of the secondary mode can be written as follows:

$$m_2\ddot{q}_2 + d_2\dot{q}_2 + k_2 q_2 = f_2(q_1, q_2, u_1, \ldots, u_m) + \Omega C_{21}\dot{q}_1 - k_{21} q_1 \quad (1)$$

In this context, $q_1$ and $q_2$ denote the primary and secondary modes, $\Omega$ denotes the rotation rate and $u_1, \ldots, u_n$, denote the voltages at the capacitive actuators, in the form of capacitors, each comprising a trimming electrode element and a mass electrode element, for influencing the secondary mode. The positive constants $m_2$, $d_2$ and $k_2$ correspond to the coefficient of inertia, damping coefficient and stiffness coefficient, while the constants $C_{21}$ and $k_{21}$, which can assume either positive or negative values, correspond to the coupling terms owing to the Coriolis effect and unbalance effect. The nonlinear input term $f_2(q_1, q_2, u_1, \ldots, u_m)$ depends on the arrangement of the capacitive actuators or of the capacitors, each comprising a trimming electrode element and a mass electrode element. If parallel plate capacitors are taken as the basis, as is shown by way of example in FIG. 1, they can be conceived in such a way that both harmonic excitation of the secondary mode and compensation of the coupling term $k_{21}q_1$ are possible by applying a constant voltage component. In addition, the constant component causes the resonance frequency of the secondary mode to be inherently influenced. Firstly it is assumed that only parallel plate capacitors with rectangular electrodes are considered. Given a number of m capacitive actuators of this type, FIG. 1 shows the i-th actuator, $i=1, \ldots, m$, composed of an electrode which is rigidly connected to the housing, as a trimming electrode element 1, and of a movable electrode, as a mass electrode element 2. The movable electrode has the translatory degrees of freedom $x_i$ and $z_i$, where $x_i$ and $z_i$ describe the movement of the center point of the movable electrode in the direction of the primary mode or of the secondary mode, that is to say if no other modes are excited the following applies $x_i = \pm r_i q_1$ and $z_i = \pm s_i q_2$ with the positive constants $r_i$ and $s_i$. The capacitance $C_i$ and the stored energy $W_{P,i}$ of the i-th actuator are then obtained as:

$$C_i = \varepsilon_0 \frac{A_i + x_i t_i}{g_i - z_i} = \varepsilon_0 \frac{A_i \pm r_i t_i q_1}{g_i \pm s_i q_2}, \quad W_{P,i} = \frac{1}{2} C_i u_i^2 \quad (2)$$

with the electrical voltage $u_i$, the dielectric constant $\varepsilon_0$, the gap $g_i$, the overlapping length $l_i$, the depth $t_i$ and the overlapping area $A_i = l_i t_i$ in the nondistorted or undeflected state. The entire impressed force of the capacitive actuators, $f_2$ in (1), is calculated as follows:

$$f_{2,i} = \frac{\partial W_{P,i}}{\partial q_2} = \mp \frac{1}{2} \frac{\varepsilon_0 s_i (A_i \pm r_i t_i q_1)}{(g_i \pm s_i q_2)^2} u_i^2, \quad f_2(q_1, q_2, u_1, \ldots, u_m) \quad (3)$$

$$= \sum_{i=1}^{m} f_{2,i}.$$

Equations (2) and (3) show that, depending on the geometric arrangement of the capacitive actuator or of the trimming electrode elements and mass electrode elements, a force effect can be applied to the secondary mode which has four different sign permutations, specifically for $x_i = \pm r_i q_1$ and $z_i = \pm s_i q_2$.

If it is firstly assumed that there are precisely four capacitive actuators, that is to say four trimming electrode elements with associated mass electrode elements which have different sign permutations, the following applies for the force acting on the secondary mode $$f_2 = \frac{\varepsilon_0}{2}\left(\frac{s_1(A_1+r_1t_1q_1)}{(g_1-s_1q_2)^2}u_1^2 - \frac{s_2(A_2+r_2t_2q_1)}{(g_2+s_2q_2)^2}u_2^2 + \right. \quad (4)$$
$$\left. \frac{s_3(A_3-r_3t_3q_1)}{(g_3-s_3q_2)^2}u_3^2 - \frac{s_4(A_4-r_4t_4q_1)}{(g_4+s_4q_2)^2}u_4^2 \right).$$

The control concept comprises on this basis the input variable transformation with the four trimming voltages $u_1$ to $u_4$ as a function of the resonance frequency manipulated variable $\tilde{u}_T$, the quadrature manipulated variable $\tilde{u}_C$ and the resetting variable $\tilde{u}_S$ according to the following equations:

$$u_1 = \sqrt{\tilde{u}_T - \tilde{u}_C + \tilde{u}_S},\ u_2 = \sqrt{\tilde{u}_T + \tilde{u}_C - \tilde{u}_S}, \quad (5)$$
$$u_3 = \sqrt{\tilde{u}_T + \tilde{u}_C + \tilde{u}_S},\ u_4 = \sqrt{\tilde{u}_T - \tilde{u}_C - \tilde{u}_S}$$

If the transformation (5) is inserted into (4) and the expression $f_2$ is linearized according to $q_1$ and $q_2$ about the working point $q_1=0$ and $q_2=0$, an approximate relationship is obtained which is valid for small deflections. Under the assumption that the gap for all parallel plate capacitors is of equal size, i.e. $g=g_j$, and the following geometric relationships $sA=s_jA_j$, $rst=r_js_jt_j$ and $s^2A=s_j^2A_j$ for $j=1,\ldots,m$ are met, which relationships can be interpreted as symmetry conditions for the weighted overlapping areas and overlapping lengths, the linear approximation is obtained as follows:

$$f_2 \cong \underbrace{\frac{2\varepsilon_0 s_j A_j}{g^2}}_{b_2}\tilde{u}_S - \underbrace{\frac{2\varepsilon_0 r_j s_j t_j}{g^2}}_{k_{21,C}}q_1\tilde{u}_C + \underbrace{\frac{4\varepsilon_0 s_j^2 A_j}{g^3}}_{k_{2,T}}q_2\tilde{u}_T. \quad (6)$$

From equation (6) it is apparent that the transformed input variables of the resonance frequency manipulated variable $\tilde{u}_T$, quadrature manipulated variable $\tilde{u}_C$ and resetting variable $\tilde{u}_S$ are now decoupled from one another. Equation (1) can now be written in the form:

$$m_2\ddot{q}_2 + d_2\dot{q}_2 + (k_2 - k_{2,T}\tilde{u}_T)q_2 = b_2\tilde{u}_S + \Omega C_{21}\dot{q}_2 - (k_{21} + k_{21,C}\tilde{u}_C)q_1 \quad (7)$$

It is directly apparent in (7) that the input $\tilde{u}_S$ can be used to harmonically excite or reset the secondary mode, the input $\tilde{u}_C$ can be used to compensate the unbalance, and the input $\tilde{u}_T$ can be used to trim the resonance frequency of the secondary mode.

In what has been derived so far, the restrictive assumption was made that all the capacitive actuators have rectangular electrodes and do not have any rotational degrees of freedom. The above concept can in fact be extended very easily to electrodes which have any desired shape and which can be formed from a finite number of sufficiently small rectangular elements. Assuming that there is a subdivision into sufficiently small elements, it is therefore also possible for the force effect of rotating electrodes of any desired shape to be approximated in the above form. Furthermore, it is assumed that the finite actuator elements are combined to form four groups $k=1,\ldots,4$ with the number $m_k$ of elements with a common sign permutation, and that they are supplied with the voltage $u_k$ or the corresponding trimming voltages. If the distributed actuators satisfy the geometric conditions:

$$sA = \sum_{j=1}^{m_1}s_{1,j}A_{1,j} = \sum_{j=1}^{m_2}s_{2,j}A_{2,j} = \sum_{j=1}^{m_3}s_{3,j}A_{3,j} = \sum_{j=1}^{m_4}s_{4,j}A_{4,j},$$

$$rst = \sum_{j=1}^{m_1}r_{1,j}s_{1,j}t_{1,j} = \sum_{j=1}^{m_2}r_{2,j}s_{2,j}t_{2,j} = \sum_{j=1}^{m_3}r_{3,j}s_{3,j}t_{3,j} = \sum_{j=1}^{m_4}r_{4,j}s_{4,j}t_{4,j},$$

$$s^2A = \sum_{j=1}^{m_1}s_{1,j}^2 A_{1,j} = \sum_{j=1}^{m_2}s_{2,j}^2 A_{2,j} = \sum_{j=1}^{m_3}s_{3,j}^2 A_{3,j} = \sum_{j=1}^{m_4}s_{4,j}^2 A_{4,j},$$

the entire force acting on the secondary mode with $$b_2 = 2\frac{\varepsilon_0}{g^2}sA,\ k_{21,C} = 2\frac{\varepsilon_0}{g^2}rst,\ k_{2,T} = 4\frac{\varepsilon_0}{g^3}s^2A$$

can in turn be approximated in the form (6).

For the actual controller design, preferably what is referred to as an envelope curve model is used, which model describes the dynamics of the Fourier coefficients of the system variables. For this purpose, it is firstly assumed that the primary mode undergoes a harmonic oscillation in the form $q_1=Q_{1,S}\sin(\omega_1 t)$ with the constant amplitude $Q_{1,S}$ and the frequency $\omega_1$, which corresponds to the natural frequency of the primary mode. Furthermore it is assumed that the secondary mode can be formed as a harmonic oscillation of the form $q_2=Q_{2,S}\sin(\omega_1 t)+Q_{2,C}\cos(\omega_1 t)$. In the case of harmonic excitation with the input $\tilde{u}_S=\tilde{U}_{S,C}\cos(\omega_1 T)$ and the constant inputs $\tilde{u}_T=\tilde{U}_{T,0}$ and $\tilde{u}_C=\tilde{U}_{C,0}$ it is possible to describe the dynamics of the Fourier coefficients $Q_{2,S}$ and $Q_{2,C}$ using the differential equation system $$\frac{d}{dt}\begin{bmatrix}Q_{2,S}\\Q_{2,C}\end{bmatrix} = \begin{bmatrix}\alpha_2 & \omega_1-\omega_2\\-\omega_1+\omega_2 & \alpha_2\end{bmatrix}\begin{bmatrix}Q_{2,S}\\Q_{2,C}\end{bmatrix} - \begin{bmatrix}\beta_{21}\Omega-\beta_2\tilde{U}_{S,C}\\\beta_{21}(\Gamma_M+\Gamma_C\tilde{U}_{C,0})\end{bmatrix} \quad (8)$$

with the damping parameter and the natural frequency of the secondary mode $$\alpha_2 = -\frac{1}{2}\frac{d_2}{m_2},\ \omega_2 = \sqrt{\frac{k_2+k_{2,T}\tilde{U}_{T,0}}{m_2}-\alpha_2^2} \quad (9)$$

as well as the input and unbalance parameters $$\beta_2 = \frac{1}{2}\frac{b_2}{m_2\omega_2},\ \beta_{21} = \frac{1}{2}\frac{\omega_1}{\omega_2}\frac{c_{21}}{m_2}Q_{1,S},\ \Gamma_M = \frac{k_{21}}{\omega_1 c_{21}}, \quad (10)$$

$$\Gamma_C = \frac{k_{21,C}}{\omega_1 c_{21}}$$

and the inputs $\tilde{U}_{T,0}$, $\tilde{U}_{C,0}$ and $\tilde{U}_{S,C}$. In the text which follows, the harmonically oscillating system variables ($q_2, \tilde{u}_S, \ldots$) are denoted as "fast" signals and the associated Fourier coefficients ($Q_{2,S}, Q_{2,C}, \tilde{U}_{S,C}, \ldots$) are denoted as "slow" signals.

By demodulating the output signal $y=C_2 q_2$ it is now possible to determine the Fourier coefficients $Y_S=C_2 Q_{2,S}$ and $Y_C=C_2 Q_{2,C}$. In conventional control concepts, phase correction of the output signal is carried out in the form of a transformation $$\begin{bmatrix} Z_R \\ Z_Q \end{bmatrix} = \begin{bmatrix} \sin(\phi) & \cos(\phi) \\ \cos(\phi) & -\sin(\phi) \end{bmatrix} \begin{bmatrix} Y_S \\ Y_C \end{bmatrix}, \phi = \arctan\left(\frac{\alpha_2}{\omega_1 - \omega_2}\right) \quad (11)$$

with the result that the combination of the two differential equations in (8), which occurs by means of the damping parameter $\alpha_2$ and the difference between the natural frequencies of the primary and secondary modes $\omega_1$-$\omega_2$, is cancelled out in a steady-state fashion. In the steady state, a rotation rate signal or quadrature signal is then obtained from $$Z_R = S\left(-\Omega + \frac{\beta_2}{\beta_{21}} \tilde{U}_{S,C}\right), Z_Q = S(\Gamma_M + \Gamma_C \tilde{U}_{C,0}) \quad (12)$$

with the sensitivity $$S = \frac{c_2 \beta_{21}}{\sqrt{\alpha_2^2 + (\omega_1 - \omega_2)^2}}. \quad (13)$$

With the actuating input $\tilde{U}_{C,0}$ it is possible to adjust the quadrature signal $Z_Q$ to zero. However, since the decoupling is precise only in the steady-state situation any change in the manipulated variable $\tilde{U}_{C,0}$ also influences the rotation rate signal. In order to avoid this problem, the following procedure is now proposed.

In the text which follows, the method and the rotation rate sensor according to concept A, illustrated in FIG. 3, will now be explained by way of example:

The transmission matrix of the system (8)-(10) for constant $\tilde{U}_{T,0}$ from the input $U = [\tilde{U}_{S,C} \tilde{U}_{C,0}]^T$ to the output $Y = [Y_S Y_C]^T$ is now obtained as:

$$G(s) = \frac{c_2}{(s-\alpha_2)^2 + (\omega_1 - \omega_2)^2} \begin{bmatrix} -(s-\alpha_2)\beta_2 & (\omega_1 - \omega_2)\beta_{21}\Gamma_C \\ (\omega_1 - \omega_2)\beta_2 & (s-\alpha_2)\beta_{21}\Gamma_C \end{bmatrix}. \quad (14)$$

If an output transformation with the transmission matrix $$T(s) = \begin{bmatrix} -1 & \frac{\omega_1 - \omega_2}{s - \alpha_2} \\ \frac{\omega_1 - \omega_2}{s - \alpha_2} & 1 \end{bmatrix}, \quad (15)$$

is selected, a decoupled section of the form $\tilde{G}(s) = T(s)G(s) = \text{diag}(\tilde{G}_{11}, \tilde{G}_{22})$ with the transmission functions $$\tilde{G}_{11} = \frac{\beta_2 c_2}{s - \alpha_2}, \tilde{G}_{22} = \frac{\beta_{21} c_2 \Gamma_C}{s - \alpha_2}. \quad (16)$$

is obtained. The components $Z_R$ and $Z_Q$ of the transformed output $Z(s) = T(s)Y(s)$ where $Z = [Z_R Z_Q]^T$ are again denoted as the rotation rate signal and quadrature signal. A decoupled controller $R(s) = \text{diag}(R_{11}(s), R_{22}(s))$, composed of the resetting controller $R_{11}$ and the quadrature controller $R_{22}$, can now be designed for the two sub-systems, given by the transmission functions (16), said quadrature controller $R_{22}$ adjusting the two components $Z_R$ and $Z_Q$ to zero. The manipulated variable of the resetting controller $\tilde{U}_{S,C}$ is then proportional to the rotation rate in the steady state (see (12) for $Z_R$=0) and serves therefore as an output of the rotation rate sensor. For ideal decoupling by the transmission matrix (15), the damping parameter $\alpha_2$ and the frequency difference $\omega_1$-$\omega_2$ must however preferably be known precisely.

A distinction is then made between what is referred to as the "split mode" and the "matched mode" operation. In the split mode operation, the input $\tilde{U}_{T,0}$ is constant and the absolute value of the frequency difference assumes a constant value $|\omega_1 - \omega_2| \gg 1$. Since the change in the sensitivity (13) owing to different damping parameters $d_2$, and therefore $\alpha_2$, does not play a significant role for a sufficiently large frequency difference, it is not necessary to control the secondary natural frequency, and offline identification of the parameters $\alpha_2$ and $\omega_1$-$\omega_2$ is sufficient. On the other hand, in the matched mode operation, a frequency interval which is as small as possible $\omega_1$-$\omega_2 \to 0$ is aimed at. The change in sensitivity has its maximum in the vicinity of the point $\omega_1 = \omega_2$, and for this reason frequency control and online identification of the frequency interval $\omega_1$-$\omega_2$ are unavoidable.

For the following design of the frequency control it will be assumed that the parameter $\alpha_2$ is known with sufficient precision from an offline identification, and the frequency controller is operated with a dynamic which is slower than an order of magnitude compared to the quadrature controller and resetting controller. It is therefore possible to assume that $\alpha_2$ is a constant and $\Delta\omega = \omega_1 - \omega_2$ is a slowly changing parameter which is made available by a suitable online identification $\Delta\hat{\omega}$. The quadrature controller and resetting controller outlined above can therefore be used with the transformation matrix $T(s)|_{\Delta\omega = \Delta\hat{\omega}}$ in the same form.

Since the rotation rate signal is used (via the resetting controller) to measure the unknown rotation rate and the quadrature signal is used to compensate the unknown unbalance, no further information, for example about the frequency difference, can be acquired from the output signal. For this purpose, an additional excitation of the secondary mode is necessary, which excitation contains, in the spectrum, frequency components which are different from the natural frequency $\omega_1$. A possibility which is easy to implement is harmonic excitation with the frequency $\omega_s = \omega_1/I$ and $I \gg 1$. If input variables of the envelope curve model (8) of the form $\tilde{U}_{S,C} = \tilde{U}_{S,C0} + \tilde{U}_{S,CS} \sin(\omega_s t) + \tilde{U}_{S,CC} \cos(\omega_s t)$ and $\tilde{U}_{C,0} = \tilde{U}_{C,00} + \tilde{U}_{C,0S} \sin(\omega_s t) + \tilde{U}_{C,0C} \cos(\omega_s t)$ and corresponding state variables $Q_{2,S} = Q_{2,S0} + Q_{2,SS} \sin(\omega_s t) + Q_{2,SC} \cos(\omega_s t)$ and $Q_{2,C} = Q_{2,C0} + Q_{2,CS} \sin(\omega_s t) + Q_{2,CC} \cos(\omega_s t)$ are therefore assumed, it is possible, by ignoring the coupling terms of the primary mode, to specify the dynamics of the new Fourier coefficients $Q_{2,SS}, Q_{2,SC}, Q_{2,CS}$ and $Q_{2,CC}$ (SC subsystem) by means of an envelope curve model $$\frac{d}{dt} \begin{bmatrix} Q_{2,SS} \\ Q_{2,SC} \\ Q_{2,CS} \\ Q_{2,CC} \end{bmatrix} = \quad (17)$$

$$\begin{bmatrix} \alpha_2 & \omega_S & \omega_1 - \omega_2 & 0 \\ -\omega_S & \alpha_2 & 0 & \omega_1 - \omega_2 \\ -\omega_1 + \omega_2 & 0 & \alpha_2 & \omega_S \\ 0 & -\omega_1 + \omega_2 & -\omega_S & \alpha_2 \end{bmatrix} \begin{bmatrix} Q_{2,SS} \\ Q_{2,SC} \\ Q_{2,CS} \\ Q_{2,CC} \end{bmatrix} +$$

-continued $$\begin{bmatrix} 0 & 0 & -\beta_2 & 0 \\ 0 & 0 & 0 & -\beta_2 \\ \beta_{21}\Gamma_C & 0 & 0 & 0 \\ 0 & \beta_{21}\Gamma_C & 0 & 0 \end{bmatrix} \begin{bmatrix} \tilde{U}_{C,0S} \\ \tilde{U}_{C,0C} \\ \tilde{U}_{S,CS} \\ \tilde{U}_{S,CC} \end{bmatrix}.$$

The dynamics of the Fourier coefficients $Q_{2,S0}$ and $Q_{2,C0}$ (0 subsystem) are described by the envelope curve model $$\frac{d}{dt}\begin{bmatrix} Q_{2,S0} \\ Q_{2,C0} \end{bmatrix} = \begin{bmatrix} \alpha_2 & \omega_1 - \omega_2 \\ -\omega_1 + \omega_2 & \alpha_2 \end{bmatrix}\begin{bmatrix} Q_{2,S0} \\ Q_{2,C0} \end{bmatrix} - \begin{bmatrix} \beta_{21}\Omega - \beta_2\tilde{U}_{S,C0} \\ \beta_{21}(\Gamma_M + \Gamma_C\tilde{U}_{C,00}) \end{bmatrix} \quad (18)$$

Figure 2:
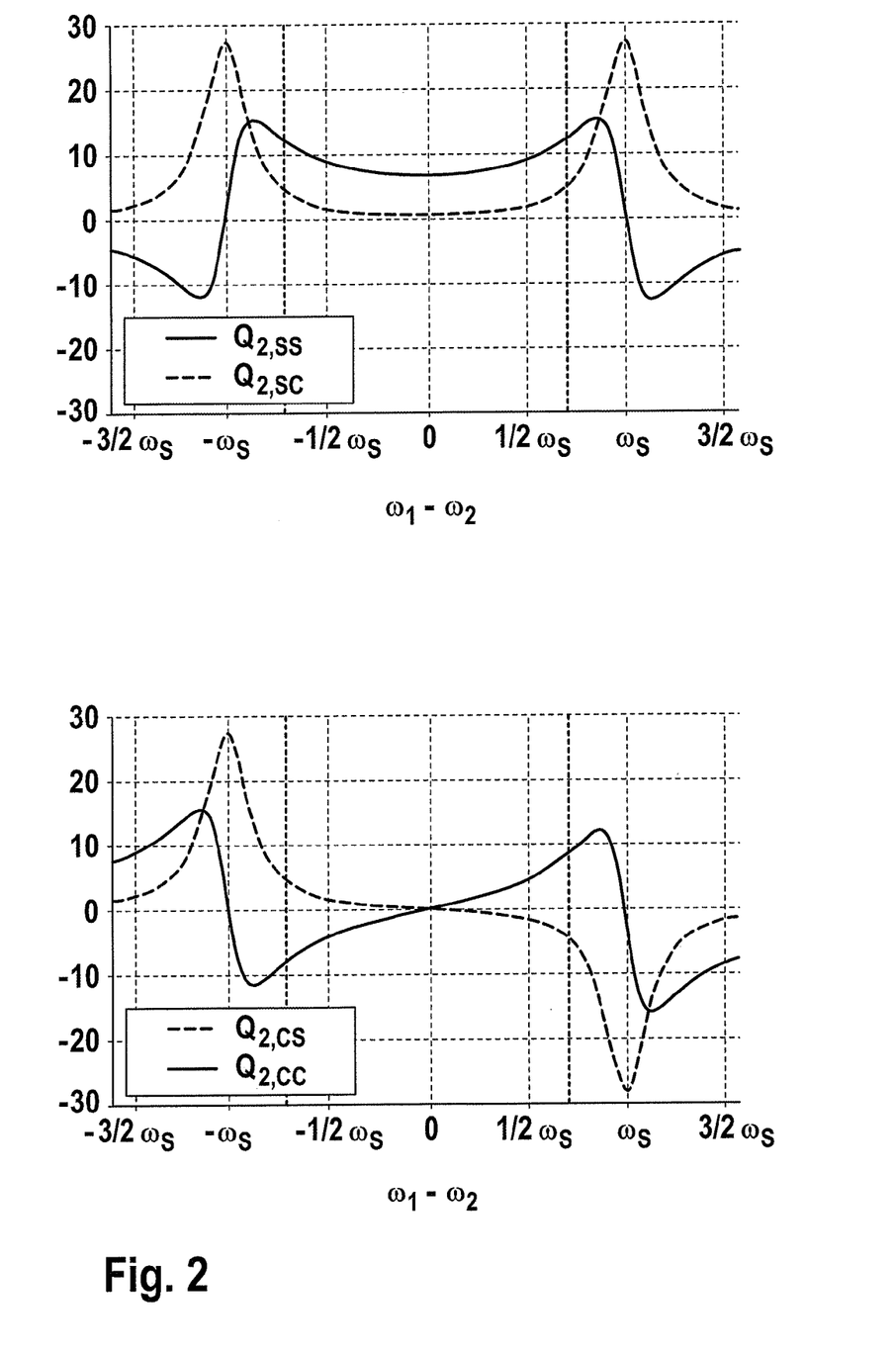
FIG. 2 shows an exemplary illustration relating to the acquisition of the frequency information on the basis of the profiles of the Fourier coefficients in the steady state.

For this reason, the decoupled resetting and quadrature controller which is described above can now be used for the 0 subsystem from the input $U_0=[\tilde{U}_{S,C0}\ \tilde{U}_{C,00}]^T$ to the output $Y_0=[Y_{S0}\ Y_{C0}]^T$ in the same form. If the steady state of (17) is considered for excitation with a constant input $\tilde{U}_{S,CC}$, ($\tilde{U}_{S,CS}=\tilde{U}_{C,0S}=\tilde{U}_{C,0C}=0$), the profile of the Fourier coefficients $Q_{2,SS}$, $Q_{2,SC}$, $Q_{2,CS}$ and $Q_{2,CC}$ which is shown in FIG. 2 occurs over the frequency interval $\omega_1$-$\omega_2$.

It is apparent that the output component $Y_{CC}=C_2Q_{2,CC}$ in the characterized region has a bijective relationship $Y_{CC}=f_S(\omega_1-\omega_2)$ with a zero crossover at $\omega_1=\omega_2$. Assuming, as mentioned above, that the dynamics of the frequency controller are significantly slower than those of the resetting controller and quadrature controller, the inverse steady-state relationship $f_S^{-1}(Y_{CC})$ can be used for online identification of the parameter $\omega_1$-$\omega_2$. For the implementation, for example by means of a look-up table, in an extreme case three working points are sufficient in the case of $\omega_1-\omega_2 \in \{-\Delta\omega_r, 0, \Delta\omega_r\}$ where $\Delta\omega_r \gg 1$.

For the actual frequency control in the matched mode operation, the output signal $Y_{CC}$ is now adjusted to zero. For this purpose, the system (17) can be linearized about the steady-state working point with constant $\tilde{U}_{S,CC}=\tilde{U}_{S,CC}^*$ in the matched mode $\omega_2^*=\omega_1$, i.e. the following applies, cf. (9):

$$\tilde{U}_{T,0}^* = \left(\omega_1^2 + \alpha_2^2 - \frac{k_2}{m_2}\right)\frac{m_2}{k_{2,T}}, \quad (19)$$

The following is obtained as a working point:

$$Y_{SS}^* = -\frac{\omega_S\beta_2c_2}{\alpha_2^2+\omega_S^2}\tilde{U}_{S,CC}^*,\ Y_{SC}^* = \frac{\alpha_2\beta_2c_2}{\alpha_2^2+\omega_S^2}\tilde{U}_{S,CC}^*, \quad (20)$$

$$Y_{CS}^* = Y_{CC}^* = 0.$$

The transmission function from the input $\tilde{U}_{T,0}$ to the output $Y_{CC}$ is as follows $$G_S(s) = \frac{1}{2}\frac{(s-\alpha_2)\alpha_2+\omega_S^2}{(s-\alpha_2)^2+\omega_S^2}\frac{\beta_2c_2k_{2,T}\tilde{U}_{S,CC}^*}{\omega_1(\alpha_2^2+\omega_S^2)} \quad (21)$$

and serves as a basis for the design of the frequency controller or the frequency controller unit $R_F(S)$. The entire control structure is illustrated in FIG. 3.

In the text which follows, the method or the rotation rate sensor according to concept B, illustrated in FIG. 4, will be illustrated:

An alternative to the direct feeding in of a harmonic input signal is the definition of a harmonic setpoint value $Y_D=[0\ Y_{CC}^*\cos(\omega_S t)]^T$ for the output of the sensor, that is to say the controlled variable $Y=[Y_S\ Y_C]^T$ of the resetting and quadrature control. If it is firstly assumed that the resetting and quadrature control is ideal and the output Y precisely follows the setpoint value, i.e. the following applies for the transmission matrix of the closed circuit:

$$T_{r,y}=(I+GRT)^{-1}GRT \cong I \quad (22)$$

and respectively $Q_{2,SS}=0$, $Q_{2,SC}=0$, $Q_{2,CS}=0$ and $Q_{2,CC}=Y_{CC}^*/C_2$, the input variable $U=[\tilde{U}_{S,C}\ \tilde{U}_{C,0}]^T$ is obtained in the steady state from equations (17) and (18) in the form:

$$\tilde{U}_{S,C} = \underbrace{\frac{\beta_{21}}{\beta_2}\Omega}_{\tilde{U}_{S,C0}} + \underbrace{\frac{\omega_1-\omega_2}{\beta_2c_2}Y_{CC}^*\cos(\omega_S t)}_{\tilde{U}_{S,CC}}, \quad (23)$$

$$\tilde{U}_{C,0} = \underbrace{-\frac{\Gamma_M}{\Gamma_C}}_{\tilde{U}_{C,00}} - \underbrace{\frac{\omega_S}{\beta_{21}\Gamma_Cc_2}Y_{CC}^*\sin(\omega_S t)}_{\tilde{U}_{C,0S}} - \underbrace{\frac{\alpha_2}{\beta_{21}\Gamma_Cc_2}Y_{CC}^*\cos(\omega_S t)}_{\tilde{U}_{C,0C}}.$$

It is apparent that the Fourier coefficient $\tilde{U}_{S,CC}$ is now linearly dependent on the frequency difference $\omega_1$-$\omega_2$. The identification of the frequency difference can therefore be carried out with the inverse mapping $g_s^{-1}$ ($\tilde{U}_{S,CC}$)= $\tilde{U}_{S,CC}\beta_2C_2/Y_{2,CC}^*$. The frequency controller then has the function of adjusting the Fourier coefficient $\tilde{U}_{S,CC}$ to zero. The transmission function, which serves as the basis for the frequency control, of the linearized section about the working point, from the input $\tilde{U}_{T,0}$ to the output $\tilde{U}_{S,CC}$ is given by the steady-state relationship:

$$G_S = -\frac{1}{2}\frac{k_{2,T}}{\beta_2c_2\omega_1}Y_{CC}^*. \quad (24)$$

The Fourier coefficient $\tilde{U}_{S,C0}$ in (23) is proportional to the rotation rate and therefore serves as an output of the rotation rate sensor. The associated cascaded control structure is illustrated in FIG. 4. In reality, the transmission matrix of the closed circuit $T_{r,y}$ is not precisely the same as the identity matrix. The response to the harmonic setpoint value predefinition then has, in the steady state, a phase shift $\phi_C$ and a change in amplitude $A_c$, which can be corrected during the subsequent demodulation by demodulating with $A_C\cos(\omega_S t+\phi_C)$ instead of $\cos(\omega_S t)$).

One advantageous feature of the present overall concept is therefore, for example, the nonlinear input variable transformation (5). Conventional methods for the control of the secondary resonance frequency of capacitive rotation rate sensors dispense with compensation of the inherent quadratic input nonlinearity. If a quadrature and/or resetting controller is required to operate the rotation rate sensor, this results in the frequency controller and the quadrature and resetting controller influencing one another. Since, in particular in the case of a resetting controller, the output signal of the rotation rate sensor corresponds to the required manipulated variable for resetting the rotation rate, the problem occurs here that the output variable of the rotation rate sensor is influenced directly by the frequency controller. Therefore if the secondary resonance frequency changes, for example owing to temperature influences, and the frequency controller compensates the resulting control error, a change also occurs in the output signal. This undesired effect can be avoided by means of the proposed input variable transformation, with the result that complex corrections by means of characteristic curve fields are not necessary.

For the completely decoupled overall system with the new transformed input variables ($\tilde{u}_T$, $\tilde{u}_C$ and $\tilde{u}_S$), the frequency controller and the quadrature and resetting controller can preferably be designed independently of one another.

For this purpose, in principle two different control concepts can be considered, which concepts differ in terms of the feedback signal which is used for the frequency control. The control concept A is distinguished by the fact that an additional harmonic input signal is fed in and the required measurement signal for the frequency controller is acquired by corresponding demodulation, as additional demodulation, of the output signal. In contrast to this, in the case of the control concept B the entire output signal is adjusted to a predefined setpoint value and the required measurement signal is acquired for the frequency control by corresponding demodulation of the manipulated variables. The control concept A is suitable in principle for frequency control without simultaneous quadrature and resetting control, but has the disadvantage of the nonlinear relationship between the resonance frequency and the associated measurement signal ($Y_{2,CC}=f_S(\omega_1-\omega_2)$), see also FIG. 2. In contrast to this, the control concept B has the advantage of a linear relationship between the resonance frequency and the associated measurement signal ($\tilde{U}_{S,CC}=Y_{2,CC}*(\omega_1-\omega_2)/(\beta_2 C_2)$), and therefore permits a stable influence zone for the frequency control which is as large as desired. In comparison with the control concept A, the complexity of the required control architecture, in particular with respect to implementation as an integrated circuit, is smaller here.

In the control concepts A and B, the quadrature and resetting control are preferably implemented by feeding back the output signal after demodulation into a quadrature component and a rotation rate component. In order to decouple the quadrature signal and rotation rate signal dynamically, and therefore to be able to design the quadrature controller and resetting controller separately from one another, use is made of the decoupling matrix T(s), of the output variable transformation unit, see (15).

The invention claimed is:

1. A method for the precise measuring operation of a micro-mechanical rotation rate sensor, comprising at least one seismic mass, at least one drive device for driving the seismic mass in a primary mode ($q_1$) and at least three trimming electrode elements which are jointly associated directly or indirectly with the seismic mass, wherein an electric trimming voltage ($u_1$, $u_2$, $u_3$, $u_4$) is applied between the at least three trimming electrode elements and the seismic mass, wherein each of these electric trimming voltages ($u_1$, $u_2$, $u_3$, $u_4$) is set as a function of a resonance frequency manipulated variable ($\tilde{u}_T$, $\tilde{U}_{T,0}$), a quadrature manipulated variable ($\tilde{u}_C$, $\tilde{U}_{C,0}$) and a resetting variable ($\tilde{u}_S$), the function includes calculating the square root of at least one of a sum and a difference between the resonance frequency manipulated variable ($\tilde{u}_T$, $\tilde{U}_{T,0}$), the quadrature manipulated variable ($\tilde{u}_C$, $\tilde{U}_{C,0}$) and the resetting variable ($\tilde{u}_S$).

2. The method as claimed in claim 1, wherein the rotation rate sensor comprises at least four trimming electrode elements which are jointly associated directly or indirectly with the seismic mass, wherein a first electric trimming voltage is applied between the first trimming electrode element and the seismic mass, a second trimming voltage is applied between the second trimming electrode element and the seismic mass, a third trimming voltage is applied between the third trimming electrode element and the seismic mass, and a fourth trimming voltage is applied between the fourth trimming electrode element and the seismic mass, wherein the first trimming voltage $u_1$, the second trimming voltage $u_2$, the third trimming voltage $u_3$ and the fourth trimming voltage $u_4$ are each set substantially with the following dependence of the resonance frequency manipulated variable $\tilde{u}_T$, the quadrature manipulated variable $\tilde{u}_C$ and the resetting variable $\tilde{u}_S$:

$$u_1 = \sqrt{\tilde{u}_T - \tilde{u}_C + \tilde{u}_S}, \ u_2 = \sqrt{\tilde{u}_T + \tilde{u}_C - \tilde{u}_S},$$
$$u_3 = \sqrt{\tilde{u}_T + \tilde{u}_C + \tilde{u}_S}, \ u_4 = \sqrt{\tilde{u}_T - \tilde{u}_C - \tilde{u}_S}.$$

3. The method as claimed in claim 1, wherein the trimming electrode elements are each embodied and arranged in such a way that a capacitor $C_1$, $C_2$, $C_3$ and $C_4$ is formed between a first, second, third and fourth trimming electrode element and a respectively associated mass electrode element of the associated seismic mass, with the associated trimming voltage being applied between the trimming electrode element and the mass electrode element, as follows:

$$C_1 = \varepsilon_0 \frac{A_1 + r_1 t_1 q_1}{g_1 - s_1 q_2}, \ C_2 = \varepsilon_0 \frac{A_2 + r_2 t_2 q_1}{g_2 + s_2 q_2}, \ C_3 = \varepsilon_0 \frac{A_3 - r_3 t_3 q_1}{g_3 - s_3 q_2},$$

and $$C_4 = \varepsilon_0 \frac{A_4 - r_4 t_4 q_1}{g_4 + s_4 q_2},$$

where i is in each case an index relating to the numbering of the electrode elements, $g_i$ is the distance across the gap between the trimming electrode element and the associated mass electrode element in the non-deflected state, $A_i$ is the overlapping area between the trimming electrode element and the associated mass electrode element in the non-deflected state, the product $\pm r_i$ times $t_i$ times $q_1$ is the change in the overlapping area as a function of the deflection of the primary mode $q_1$, wherein $t_i$ is the overlapping depth between the trimming electrode element and the associated mass electrode element, and n is a first positive geometric constant relating to the deflection of the primary mode $q_1$, and the product $\pm s_i$ times $q_2$ is the change in the distance across the gap between the trimming electrode element and the mass electrode element as a function of the deflection of the secondary mode $q_2$, wherein $S_i$ is a second positive geometric constant relating to the deflection of the secondary mode $q_2$.

4. The method as claimed in claim 3, wherein $A_i$, $r_i$, $t_i$, $g_i$ and $s_i$, are substantially the same in all the trimming electrode element mass electrode element capacitor arrangements.

5. The method as claimed in claim 1, wherein the rotation rate sensor comprises a control arrangement with which the electric trimming voltages are adjusted, wherein a demodulated controlled variable (Y) is fed to a first controller unit, which the demodulated controlled variable (Y) is acquired, in particular, by means of demodulation from an original controlled variable (y) using two harmonic signals which are phase-shifted through 90° with respect to one another, wherein the original controlled variable (y) represents the detected deflection of the seismic mass in the direction of secondary mode ($q_2$).

6. The method as claimed in claim 5, wherein the control arrangement has an output variable transformation unit in which the demodulated controlled variable (Y) is transformed dynamically as a function of a frequency difference between a primary mode frequency ($\omega_1$) and a secondary mode frequency ($\omega_2$) and at least one damping parameter ($\alpha_2$) or is transformed in a steady-state fashion into a rotation rate variable and a quadrature variable (Z, $Z_0$) as a function of at least one transformation constant, after which a rotation rate control error variable and a quadrature control error variable are formed therefrom, in each case with the definition of a reference variable, and subsequently the rotation rate control error variable and the quadrature control error variable are fed as input variables to the first controller unit which generates at least the quadrature manipulated variable ($\tilde{u}_C$, $\tilde{U}_{C,0}$) and the resetting variable ($\tilde{u}_S$, $\tilde{U}_{S,C}$) on an output side for partially decoupled quadrature suppression and resetting of the deflection of the seismic mass on the basis of a detected rotation rate.

7. The method as claimed in claim 5, wherein a control error variable is formed from the demodulated controlled variable (Y) with the definition of a control reference variable, after which the control arrangement is dynamically transformed in an output variable transformation unit the control error variable as a function of a frequency difference between a primary mode frequency ($\omega_1$) and a secondary mode frequency ($\omega_2$) and at least one damping parameter ($\alpha_2$) or is transformed in a steady-state fashion into a rotation rate control error variable and a quadrature control error variable (Z, $Z_0$) as a function of at least one transformation constant, after which the rotation rate control error variable and the quadrature control error variable are fed as input variables to the first controller unit which generates on an output side at least the quadrature manipulated variable ($\tilde{u}_C$, $\tilde{U}_{C,0}$) and the resetting variable ($\tilde{u}_S$, $\tilde{U}_{S,C}$) for partially decoupled quadrature suppression and resetting of the deflection of the seismic mass on the basis of a detected rotation rate.

8. The method as claimed in claim 1, wherein the rotation rate sensor, has a manipulated variable transformation unit, by which the trimming voltages $u_1$, $u_2$, $u_3$ and $u_4$ are made available as a function of the resonance frequency manipulated variable $\tilde{u}_T$, the quadrature manipulated variable $\tilde{u}_C$ and the resetting variable $\tilde{u}_S$ in accordance with the equations $$u_1 = \sqrt{\tilde{u}_T - \tilde{u}_C + \tilde{u}_S}, u_2 = \sqrt{\tilde{u}_T + \tilde{u}_C - \tilde{u}_S},$$
$$u_3 = \sqrt{\tilde{u}_T + \tilde{u}_C + \tilde{u}_S}, u_4 = \sqrt{\tilde{u}_T - \tilde{u}_C - \tilde{u}_S}.$$

9. The method as claimed in claim 6, wherein the output variable transformation unit is configured to carry out multiplication of the demodulated controlled variable (Y), with the following transformation matrix $$T(S) = \begin{bmatrix} -1 & \frac{\omega_1 - \omega_2}{s - \alpha_2} \\ \frac{\omega_1 - \omega_2}{s - \alpha_2} & 1 \end{bmatrix},$$

where $\alpha_2$ is a damping parameter relating to the secondary mode, and s is the Laplace variable.

10. The method as claimed in claim 6, wherein the control arrangement has a frequency controller unit which makes available the resonance frequency manipulated variable ($\tilde{u}_T$, $\tilde{U}_{T,0}$) as a function of a frequency information item or as a function of a frequency control error information item dependent thereon from the demodulated controlled variable (Y).

11. The method as claimed in claim 10, wherein a harmonic frequency identification signal ($\tilde{U}_{S,CC} \cos(\omega_s t)$) is generated in which frequency identification signal ($\tilde{U}_{S,CC} \cos(\omega_s t)$) has a frequency $\omega_S$ which is different from the primary mode frequency ($\omega_1$), wherein the frequency identification signal ($\tilde{U}_{S,CC} \cos(\omega_s t)$) is superimposed on the quadrature manipulated variable ($\tilde{u}_C$, $\tilde{U}_{C,0}$) and/or the resetting variable ($\tilde{u}_S$, $\tilde{U}_{S,CO}$) after which the frequency information is acquired from the demodulated controlled variable (Y) after additional demodulation with the frequency $\omega_s$ by means of the frequency difference between the primary mode frequency $\omega_1$) and the secondary mode frequency ($\omega_2$), after which at least the resonance frequency manipulated variable ($\tilde{u}_T$, $\tilde{U}_{T,0}$) is made available by the frequency controller unit.

12. The method as claimed in claim 11, wherein after the additional demodulation with the frequency $\omega_s$ the frequency information of the output variable transformation unit is made available, and in addition a frequency control error information item is acquired from the frequency information by means of a frequency information reference variable which is, in particular, 0 Hz, after which the frequency control error information is fed to the frequency controller unit which generates the resonance frequency manipulated variable ($\tilde{u}_T$, $\tilde{U}_{T,0}$) therefrom.

13. The method as claimed in claim 6, wherein the harmonic frequency identification signal ($Y_D$) is introduced as a reference variable or superimposed on the reference variable, either upstream of the output variable transformation unit in order to generate a control error variable, or respectively downstream of the output variable transformation unit in order to generate the rotation rate control error variable and the quadrature control error variable, after which the rotation rate control error variable and the quadrature control error variable are fed as input variables to the first controller unit which generates at least the quadrature manipulated variable ($\tilde{u}_C$, $\tilde{U}_{C,0}$,) and the resetting variable ($\tilde{u}_S$, $\tilde{U}_{S,C}$) on the output side.

14. The method as claimed in claim 13, wherein the resetting variable ($\tilde{u}_s$, $\tilde{U}_{s,c}$), which is subject to information of the frequency identification signal, is then demodulated with the frequency $\omega_s$, as a result of which the frequency information is acquired, after which the frequency information is made available to the output variable transformation unit, and in addition a frequency control error information item is acquired from the frequency information by means of a frequency information reference variable which is, in particular, 0, after which the frequency control error information is fed to the frequency controller unit, which generates the resonance frequency manipulated variable ($\tilde{u}_T$, $\tilde{U}_{T,0}$) therefrom.

15. A micro-mechanical rotation rate sensor, comprising at least one seismic mass, at least one drive device for driving the seismic mass in a primary mode ($q_1$) and at least three trimming electrode elements which are jointly assigned directly or indirectly to the seismic mass, wherein an electric trimming voltage is applied between the at least three trimming electrode elements and the seismic mass, wherein the rotation rate sensor is embodied in such a way that it is suitable for carrying out the method comprising setting electric trimming voltages ($u_1$, $u_2$, $u_3$, $u_4$) as a function of a resonance frequency manipulated variable ($\tilde{u}_T$, $\tilde{U}_{T,0}$), a quadrature manipulated variable ($\tilde{u}_C$, $\tilde{U}_{C,0}$) and a resetting variable ($\tilde{u}_S$), the function includes calculating the square root of at least one of a sum and a difference between the resonance frequency manipulated variable ($\tilde{u}_T$, $\tilde{U}_{T,0}$), the quadrature manipulated variable ($\tilde{u}_C$, $\tilde{U}_{C,0}$) and the resetting variable) ($\tilde{u}_S$).

* * * * *